(12) United States Patent
Coppola et al.

(10) Patent No.: US 10,464,267 B2
(45) Date of Patent: Nov. 5, 2019

(54) CONTINUOUS FIBER LATTICE FOR REINFORCING POLYMERIC COMPOSITES

(71) Applicant: GM GLOBAL TECHNOLOGY OPERATIONS LLC, Detroit, MI (US)

(72) Inventors: Anthony M. Coppola, Rochester Hills, MI (US); Hamid G. Kia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 15/636,705

(22) Filed: Jun. 29, 2017

(65) Prior Publication Data
US 2019/0001587 A1    Jan. 3, 2019

(51) Int. Cl.
| | | |
|---|---|---|
| *B29C 70/22* | (2006.01) | |
| *B29B 15/12* | (2006.01) | |
| *B29C 70/54* | (2006.01) | |
| *B29C 45/14* | (2006.01) | |
| *B29C 70/46* | (2006.01) | |
| *B29C 70/48* | (2006.01) | |
| *B29C 70/68* | (2006.01) | |
| *B29K 105/00* | (2006.01) | |
| *B29L 23/00* | (2006.01) | |
| *B29K 105/20* | (2006.01) | |

(52) U.S. Cl.
CPC ........... *B29C 70/222* (2013.01); *B29B 15/12* (2013.01); *B29B 15/125* (2013.01); *B29C 45/14631* (2013.01); *B29C 45/14786* (2013.01); *B29C 70/462* (2013.01); *B29C 70/48* (2013.01); *B29C 70/541* (2013.01); *B29C 70/688* (2013.01); *B29K 2105/206* (2013.01); *B29K 2105/258* (2013.01); *B29L 2023/00* (2013.01); *B32B 2260/021* (2013.01)

(58) Field of Classification Search
CPC .................................................... B29C 70/222
USPC ........................................................... 428/113
See application file for complete search history.

(56) References Cited

U.S. PATENT DOCUMENTS

2010/0266833 A1* 10/2010 Day ................... B29C 44/1285
428/304.4

OTHER PUBLICATIONS

U.S. Appl. No. 15/225,025, filed Aug. 1, 2016; Polymeric composite engine assembly and methods of heating and cooling said assembly; Hamid G. Kia.

* cited by examiner

*Primary Examiner* — Brent T O'Hern
(74) *Attorney, Agent, or Firm* — Reising Ethington P.C.

(57) ABSTRACT

Continuous fiber tow structures are used to form lattice reinforcing bodies to be embedded in a molded polymer matrix. The lattice structures are formed and shaped to reinforce a portion of a predetermined three-dimensional article. Optionally, some or all of the tow members of the structure may be formed with internal vascular passages for passage of a heat transfer fluid through the structure in the function of the molded polymer article. A liquid polymer is molded around the lattice structure, fully embedding the structure. The liquid polymer which may contain short-reinforcing fibers, is then solidified to form the composite reinforced polymer article. And connections may be made to the composite article for the flow of the fluid through vascular passages in the lattice structure within the article.

12 Claims, 3 Drawing Sheets

CONTINUOUS FIBER LATTICE FOR REINFORCING POLYMERIC COMPOSITES

TECHNICAL FIELD

This disclosure pertains to reinforced polymer articles in which lattice structures of continuous fibers are prepared and used as scaffold-like reinforcing members which are subsequently embedded within a molded polymer matrix material. In some applications, the continuous fiber lattice structures may be prepared to include vascular passages for flow of a heat transfer fluid within and through the composite polymer article.

BACKGROUND

This section provides background information related to the present disclosure which is not necessarily prior art.

In many components for automobiles and for other consumer applications it is desired to replace metal or metal alloy members with molded, or otherwise shaped, articles formed of reinforced polymers. This may be done for the purpose of reducing the weight of a particular article or component. In the case of automobile components, examples for such reinforced polymer applications may include engine cylinder blocks, transmission casings, pump housings, battery packs, and the like.

There remains a need for improved design strategies and manufacturing methods for making strong and light weight, composite reinforced polymer articles.

SUMMARY

It is desired to make a molded composite polymeric article (often injection molded) with a polymeric matrix containing an embedded (molded-in-place) reinforcing structure formed of tow material, generally continuous fiber tow material. The polymeric matrix portion of the article may optionally contain short reinforcing fibers (non-continuous fibers). But the polymer matrix portion of the article contains an embedded, scaffold-like, lattice structure of a continuous tow material. The tow itself may be a traditional tow material formed of a group of many continuous fibers. In other embodiments, an individual fiber (optionally a hollow fiber), or a tube may be used as a tow-like material. The composition of the tow (or tow-like) material may be carbon, an organic polymer, a metal or metal alloy composition, or a ceramic or glass composition. In many applications, the continuous tow material is formed as a vascular or hollow tube-like structure that can permit the flow of a cooling or heating fluid (gas or liquid) within and through the reinforcing structure for the purpose of managing the temperature of the composite polymeric article.

For the purpose of an illustrative example, if the composite polymeric article is to serve as a housing member for one or more cylinders of a reciprocating piston, internal combustion engine, the scaffold-like reinforcing structure of hollow tow members may have a cylindrical lattice shape around each metal cylinder-liner wall and its coolant passage, so as to provide strength and stiffness within a short fiber-reinforced polymer matrix (the short fiber reinforcement is optional) defining the shape of the engine cylinder housing member. As a further illustrative example, inlet and outlet connections may be provided to hollow members of the lattice tow structure to enable fluid flow for cooling (or heating) of the housing member surrounding and containing the combustion cylinder chambers of the reciprocating engine.

In accordance with a first embodiment of this disclosure, a multifiber, tow-like material is formed of long (continuous) fibers of a selected reinforcing material such as, for example, carbon fibers, polymer fibers, and glass fibers. In this exemplary embodiment, a long tow-like structure of a group of interwound fibers, may be formed in suitable lengths with an enclosed central channel for enabling a cooling or heating fluid to be directed through the channel(s) of the tow material. In some applications, polymer-impregnated and stiffened, individual tow strips may be used to form, for example, rectangular or cylindrical scaffold-like reinforcing shapes of vertical and horizontal tow strip members.

In another embodiment, the reinforcing lattice shape may be formed of braided carbon fibers or other braided tow fibers (like braided wound Towpreg fibers), the size and shape of the braid being in the intended reinforcing lattice shape. For example, the braided continuous fiber structure may be formed on or around a suitably shaped mandrel to help define and form the cross-sectional shape and the length of the braided reinforcing lattice structure. The individual fibers of the braided structure are often wetted or impregnated with a suitable thermosetting resin which can be partially cured during processing steps and fully cured to suitably stiffen the braided lattice reinforcing structure. And optionally, some or all of the continuous fibers in the braid may have been formed around a sacrificial metal or polymer filament which can be removed from the support structure such that some fibers are hollow (vascular), and a heat transfer fluid may be directed through the reinforcing structure portion of the molded polymer product or article.

After the scaffold-like structure has been formed and rigidified, it is placed in a suitable mold and a flowable liquid polymer, optionally mixed with short reinforcing fibers, is injected, or otherwise molded, around and against the surfaces of the pre-formed scaffold-like lattice structure to define the overall shape of the intended article. Typically, the continuous fiber-based reinforcing structure occupies only a minor portion by volume of the composite molded article.

In another example, a series of spaced shaping posts may be arranged and used to define a lattice outline of the reinforcing structure. For example, a group of vertical, parallel shaping posts of equal length may be arranged to define the portion of an engine block housing around intended positions of metal cylinder liners and their coolant passages. Continuous lengths of the tow material are then wound around the posts and between the vertical posts to define a desired reinforcing scaffold-like structure. Again, the fibrous tow material is wetted with a curable polymer for subsequent timely stiffening (rigidifying) of the tow material. In accordance with this tow-winding embodiment, one or more lengths of the fibrous tow is used to form a generally continuous fiber lattice that is structurally complementary to the intended shape and function of a desired product or article of manufacture.

The individual strands of tow material may be formed of one or more co-extensive lengths of individual fibers or of groups of wound fibers to define the intended scaffold-like reinforcing lattice structure. The tow material is preferably suitably wetted with a curable liquid polymer. Subsequent to the winding of tow material, the polymer resin is then suitably dried, hardened, or cured to stiffen or rigidify the intended reinforcing lattice structure of the continuous fibrous material. The polymer-stiffened reinforcing structure is then removed from the original group of posts and placed in a suitable mold, and a flowable liquid polymer mixed with short reinforcing fibers is injected around the pre-formed scaffold-like structure to define the overall shape of the intended molded composite article. Upon curing of the thermoset polymer, or cooling of the thermoplastic polymer, the reinforced article is formed.

The shapeable continuous reinforcing tow or tow-like material, of suitable diameter and length, is an important material for use in the practices of this invention. Traditional tow material is formed of a collection of many fibers. For example, carbon fibers are sold as 1000 fibers per tow (called 1 k tows) up to about 50,000 fibers per tow (called 50 k). When using traditional tow fibers, they may be wound, woven, or braided into a linear tow material of suitable length. Such a tow material may be formed with a suitable internal channel for subsequent fluid flow along its length. For example, the tow material may be formed around a removable, sacrificial filament, such as a low melting metal or polymer wire, to preserve the channel during processing of the tow material with a liquid polymer. The tow material may be prepared in substantial lengths and initially infiltrated with a suitable liquid polymer composition for subsequent stiffening of a formed lattice structure of the tow material.

As stated, individual fibers and tubes may be used as tow-like reinforcing materials. And if a fluid flow channel is to be formed in the tow, it will be formed with a suitable interior channel along its length. Individual fibers and tubes are not usually used as wound shapes, but they may be assembled into reinforcing, scaffold-like lattice shapes for use as reinforcing structures in molded polymers.

The prepared, polymer-wetted, traditional tow material may be wound, with intervening paper layers, into storage rolls for subsequent use in forming a desired reinforcing lattice structure. Then, as the tow material is later formed into portions of a reinforcing member, it will have been impregnated with a suitable uncured liquid polymer material which will timely be hardened or cured to maintain the desired shape of the fibrous tow member(s) of the reinforcing structure. As stated, the formed, polymer-stiffened, reinforcing structure of continuous fibers is carefully shaped and formed (such as by braiding a group of tows) in a lattice structure to serve its role in strengthening the composite article when the short fiber reinforced polymer matrix composition is thereafter molded or otherwise shaped as a polymeric matrix in full contact with the tow portion of the scaffold-like structure. In general, it is preferred that the reinforcing lattice structure be prepared to strengthen only selected regions of the volume of the polymer molded article. In most applications, the volume of the reinforcing lattice structure will occupy only a relatively small portion of the total volume of the molded article, for example up to about twenty volume percent of the total volume of the molded polymer portion of the article.

In a further embodiment of this disclosure, a process is disclosed for forming a continuous three-dimensional fiber fabric (similar to the Parabeam commercial material) for reinforcement of molded polymer articles (such as an engine housing) defining hollow cylindrical portions requiring such reinforcement. The Parabeam-type three-dimensional fiber fabric is characterized by a relatively dense layer of fine fibers, defining the surfaces of a sandwich type fabric, with a lower density (sparse) group of fibers interconnecting the two surface layers. The group of interconnecting fibers do not completely fill the space between the dense fibrous surface layers. The commercial material is designed to replace sandwich panels that have a composite skin with a foam or honeycomb core. But the Parabeam-type material is used differently in this invention.

For example, the surfaces of the sparse group of fibers in the interior of a suitable section (or sections) of such three-dimensional fiber fabric may be wetted in the interior region with a suitable thermosettable polymeric resin. Although the surfaces of the connecting fibers are coated with a liquid resin, space remains between the resin-coated connecting fibers. This thermosetting resin permits stiffening of the three-dimensional, sandwich-type fabric. The section of resin-impregnated fabric is prepared to have a suitable two-dimensional shape and thickness, for example for wrapping around a cylindrical pattern, such as the cylinder bore (and its surrounding coolant passage) for a reciprocating piston internal combustion engine. The wetting resin is hardened to set the shape of the porous fiber into a hollow sleeve. One or more such sleeves may then be strategically placed in a suitable mold and a short fiber reinforced polymer injected into the mold and around and into the porous fiber sleeves to form, for example, a cylinder housing member.

It is apparent that a wide range of strong and relatively light weight composite polymeric articles may be formed which utilize a preformed, strategically shaped, continuous tow-stiffened, scaffold-like structure which is placed in a suitable mold to be intimately enclosed in a polymer matrix which is optionally further reinforced with short fibers. As will be further described below in this specification, many different fiber materials and polymer compositions may be used to determine the physical and chemical properties of the ultimate composite polymer article.

BRIEF DESCRIPTION OF THE DRAWINGS

FIG. 3A illustrates the top ends of the winding post and the location of pattern cores for the location of the reinforcing structure around the two engine cylinders.

DESCRIPTION OF PREFERRED EMBODIMENTS

There is a continual need and goal to reduce the weight of many articles of manufacture while retaining suitable strength and durability. Among such articles are components of automobiles. Many such components, for example engine components, experience substantial physical stresses and temperature changes in use, previously requiring them to be made of suitable, relatively heavy, metal alloys. Automobile internal combustion, reciprocating piston engines include several components formed of ferrous alloys and aluminum alloys. A weight reduction of one or more of such components could, for example, enable an increase in the fuel economy of the vehicle in which it is used. There is interest in adapting suitably reinforced molded polymeric articles for some such components.

One example of a practice of this invention may be illustrated in the making a cylinder block housing member of an internal combustion automotive engine. The cylinder block contains a number of parallel hollow cylinder portions for the reciprocating pistons of the engine. The hollow cylinder portions of the cylinder housing member support and contain a metal cylinder liner, within which the piston moves up and down at very high speeds, and an engine coolant passage at the outer surface of the cylinder liner. The cylinder block housing usually has a flat upper surface for closure of the upper region of the cylinders with a cylinder head member which is bolted to the cylinder block. The lower end of the cylinder block is connected with an engine crankcase housing component which confines the crank shaft and connecting rods for moving each piston in its four-stroke, up-and-down reciprocating motion in its cylinder. Such four-stroke motions (i) draw a combustible mixture of fuel and air into each cylinder, (ii) compress the mixture for combustion, (iii) experience a power stroke upon combustion, and (iv) exhaust the gaseous combustion products from the cylinder and engine. Obviously, the repeated power generating activity in the cylinder exposes the cylinder housing to the stress and temperatures of the engine operation. Such an engine cylinder housing member is an example of a product to be made by the subject process in which a molded polymer cylinder housing member is reinforced by a continuous fiber lattice structure in the limited region of the housing carrying the cylinder liner and its coolant passage.

Figure 1A:
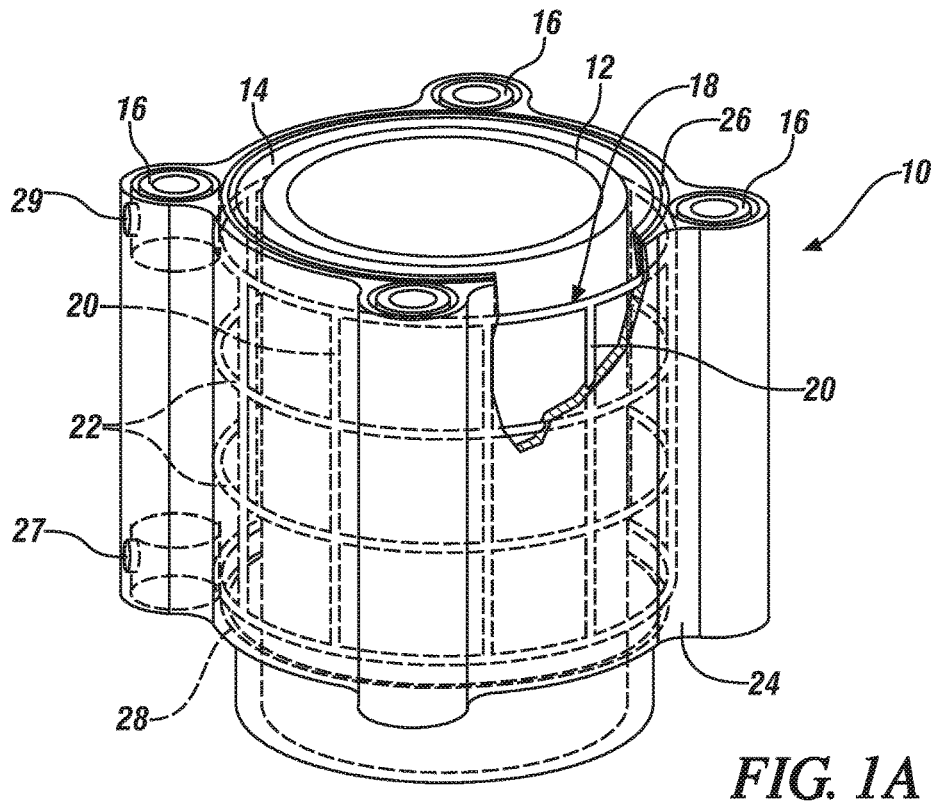
FIG. 1A is an illustration of a hollow cylindrical scaffold-like lattice of reinforcing fibrous tow members for a molded polymeric section of an engine cylinder block housing for a reciprocating-piston internal combustion engine. The section of the cylinder block housing is for enclosing a metallic cylinder liner and surrounding passage for the flow of an engine coolant. In this illustration, the fibrous tow structure (e.g., carbon fiber tows) comprises circumferentially-spaced vertical members and vertically-spaced circumferential members, formed to lie outside the cylinder liner of the engine. The scaffold reinforcing fibrous tow structure is subsequently embedded in the molded short fiber reinforced epoxy resin housing.

FIG. 1A is an illustration of a portion of a lattice-reinforced, molded polymer matrix, engine cylinder housing prepared in accordance with a practice of this invention. The illustration is focused on the housing portion around a single cylinder to simplify the description. In many applications of the invention, the reinforced molded engine cylinder housing would be sized and shaped to enclose two or more engine cylinders and cylinder liners.

In FIG. 1A a molded reinforced polymer cylinder housing 10 is illustrated. A portion of the molded housing is broken away to reveal the lattice reinforcing structure 18 which is further described in a following paragraph of this specification. Contained within cylinder housing 10 is a cylinder liner 12 formed of a suitable metal alloy for containing a reciprocating piston and undergoing the stages of the combustion process of the engine (not illustrated).

The lower end of the cylinder liner 12 is somewhat cooler in engine operation and the lower end (not visible in the figure) of the cylinder liner 12 is engaged and supported by the reinforced polymer cylinder housing 10. The upper end of cylinder liner 12 is separated from the facing surface of cylinder housing 10 by a cylindrical passage 14 in which engine cooling is circulated (by means not illustrated) when the engine is operating. At four equally-spaced outer regions of cylinder housing 10 are vertical, hollow round sections for receiving suitable bolt liners 16 for bolts by which cylinder housing 10 is attached to other members of the engine structure.

The major portion of the body of cylinder housing 10 is formed of a molded polymer composition (the matrix of the molding) such as, for example, a thermoset epoxy resin. The volume of the thermoset epoxy resin may contain uniformly dispersed, short reinforcing fibers of, for example, carbon, glass, basalt, or the like. But the region of cylinder housing 10 near the cylinder liner 12 is further reinforced by a scaffold-like, lattice structure 18 of a suitable number (eight in this illustration) of vertical post-like strips 20 of resin-stiffened, continuous fiber tow material. The post-like bodies are interconnected with a suitable number (four in this illustration) of circumferential band-like strips 22 of the same resin-stiffened, continuous fiber tow material. As stated, lattice structure 18, formed of the resin-stiffened continuous fiber tow material, is sized and shaped to be positioned in molded cylinder housing 10 close to and around cylinder liner 12.

Accordingly, lattice structure 18 of the continuous fiber tow material is prepared first. It is then placed in a mold with a mold cavity defining the outer surfaces of cylinder housing 10. And a suitable liquid polymer matrix material (e.g., the above stated short fiber reinforced epoxy resin) is injected or otherwise delivered into the mold cavity to fully surround, contact, and embed the structural members (20, 22) of the reinforcing lattice structure 18. Upon setting or solidification of the matrix polymer material 24, the composite reinforced cylinder housing 10 is formed.

In some embodiments of the invention, some of the vertical members 20 and circumferential members 22 of the lattice structure 18 may be formed with hollow cores or vascular passages for the purpose of enabling the flow of a heat transfer fluid (such a cooling air) through some or all of the members of the lattice structure. Practices for forming tow members with vascular passages are described below in this specification, and such passages are not illustrated in FIG. 1A. Such fluid flow through the hollow passages can be used to enhance the performance and durability of the composite cylinder housing molding 10.

In the event that vertical members 20 and/or circumferential members 22 of the lattice structure 18 are formed with vascular passages, then provision is made in the cylinder housing matrix to provide for fluid access to the lattice structure. For example, a circumferential groove 26 may be milled in the upper surface of the cylinder housing matrix 24 and a like circumferential groove 28 milled in the lower surface of the cylinder housing matrix 24. Such grooves 26, 28 are machined in the housing matrix so as to intersect a member of the lattice structure containing a vascular passage. A fluid access port 27 contacting groove 28 may be machined or formed in an adjacent lower portion of the cylinder housing matrix 24. And a fluid outlet port 29 may be similarly formed to contact groove 26 at an adjacent upper portion of the cylinder housing matrix. In other words, when the lattice structure is made to contain vascular passages for a heat transfer fluid, provision is made in the formation or machining of the housing matrix 24 to enable circulation of the fluid to and from the lattice structure.

Figure 4:
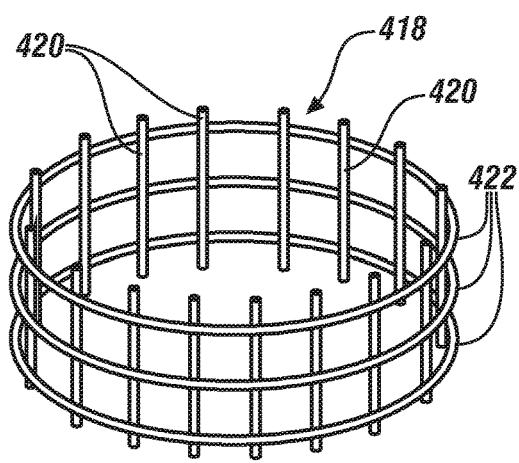
FIG. 4 illustrates an alternative form of lattice reinforcing structure for use, for example, in the molding of the reinforced polymer engine cylinder housing of FIG. 1A.

FIG. 4 illustrates a slightly different form of a lattice structure 418 for a cylinder housing 10 of FIG. 1A. Lattice structure 418 also consists of a group of vertical post-like strips 420 of resin-stiffened, continuous fiber tow material. The post-like strips are interconnected with a suitable number of circumferential band-like strips 422 of the same resin-stiffened, continuous fiber tow material. The lattice structure 418 would be embedded in a molded polymeric housing matrix 24 like that in FIG. 1A.

Figure 1B:
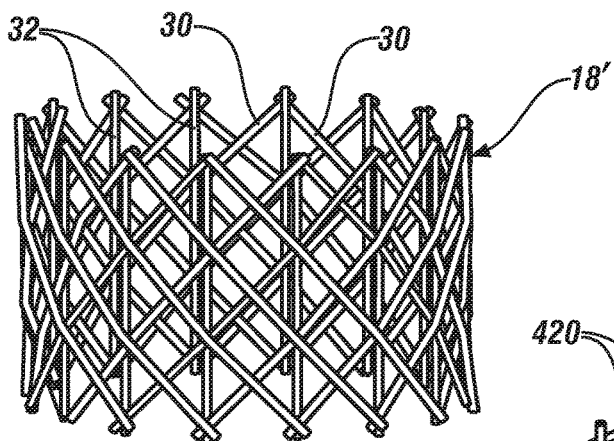
FIG. 1B illustrates a second form of a hollow cylindrical lattice of reinforcing tow members for the molded polymeric cylinder block housing of FIG. 1A. In this embodiment, a group of resin-impregnated carbon fiber tows have been braided and cut-off in a lattice structure, sized and shaped for incorporation into the molded cylinder block housing such as that illustrated in FIG. 1A.

FIG. 1B illustrates a further different example of a braided continuous fiber lattice structure 18' for the composite molded cylinder housing molding 10 of FIG. 1A. In FIG. 1B, the lattice structure 18' is formed as a round, hollow braid of several long (continuous) carbon tows. In the braid structure, some of the continuous tows 30 lie in generally over-and-under diagonal crossing paths, and some of the continuous tows 32 are located in a generally longitudinal path, intersecting diagonal tows 30. The braided continuous fiber lattice structure 18' is formed such that it has a diameter and length to serve as the lattice reinforcing structure in the composite molded cylinder liner housing 10 of FIG. 1A. And as described with respect to FIG. 1A, some or all of the tow members of the braided structure may be formed with vascular passages for the managed flow of a heat transfer fluid through the lattice structure of the composite polymer molding.

In the braid structure, the tows may be individual fibers or groups of one thousand (or more) tow fibers. As stated above in this specification, the tow material may be selected from many fiber materials which are grouped, wound, woven, braided, or the like into suitable tow materials. As will be described in more detail below in this specification, the continuous fiber braided tow material is wetted and infiltrated with a suitable thermosetting resin before being formed into the lattice reinforcing structures used in this invention. When the lattice structure has been formed, the resin is cured or hardened to rigidify the lattice structure for its placement in a mold for molding.

Examples (which are not intended to be limiting examples) of suitable materials for use as either continuous fibers for tow materials or as short fibers for matrix resins include carbon fibers, basalt fibers, glass fibers, aramid polymer fibers and ultrahigh molecular weight polyethylene fibers. Such fibers may also consist of natural fibers such as fibers of cotton, flax, hemp, jute, and sisal.

Non-limiting examples of resins for infiltration of tow fibers or for matrix polymers include thermoset polymers such as epoxy resins, phenolic resins, polyurethanes, polyesters, BMIs, polyimides, and benzoxazines. Non-limiting examples of thermoplastic resins include polyamides, polyethylenes, polypropylenes, and other lower alkyl polymers.

Figure 2B:
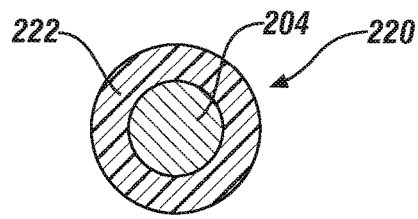
FIG. 2B is cross-section of tow material (e.g., carbon fibers) produced by the process of FIG. 2A. The tow structure contains a sacrificial channel template filament to preserve a flow channel in the tow material during the manufacture of the lattice structure. The sacrificial channel template will be removed at a suitable stage in the preparation of the tow structure or of the composite molded polymer article.
Figure 2A:
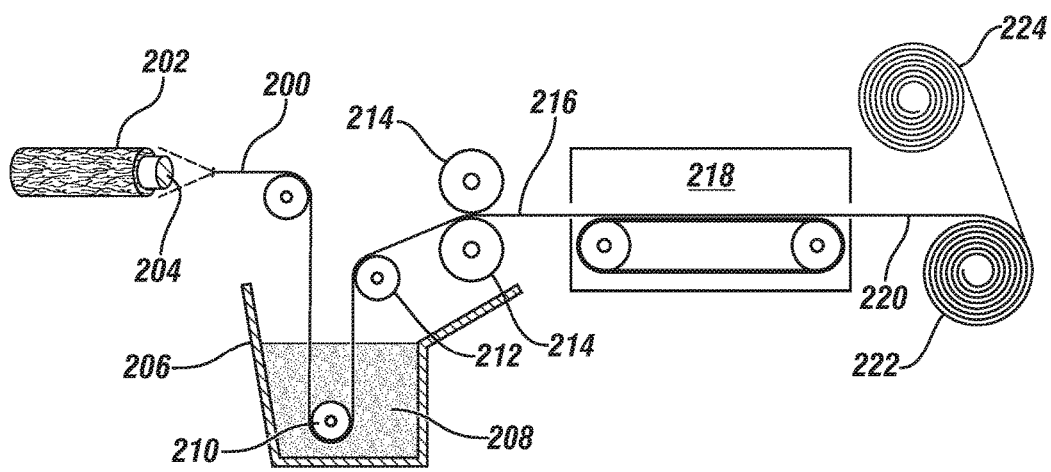
FIG. 2A is a schematic illustration of a continuous flow process in which a tow of carbon fibers, containing a co-extensive central metal solder channel template filament, is initially passed through a solution of an uncured epoxy resin to infiltrate the carbon fibers with the epoxy solution. The resin-wetted tow is then passed through a set of rolls to remove excess resin, passed through a heated oven to remove solvent and to partially cure the resin to a tacky state, and then wound onto a storage roll with an interposed paper layer.

FIG. 2A illustrates a flow process for preparing pre-impregnated tow material which also has a hollow core passage (vascular passage) along its length. The core passage is intended for the passage of a heating or cooling fluid, liquid or gas, along the length of the tow material when it has been assembled as a reinforcing lattice structure in a molded polymer matrix. Commercial materials are available in which a continuous fibrous tow material (e.g. carbon fiber tow material) is formed around a core of a low melting metal filament. The low melting metal is a suitable solder-type alloy and is intended to be melted and removed (sacrificed) from the core of the fibrous tow material. The diameters of the sacrificial metal filament and of the surrounding fibrous tow may be varied, such that the diameter of the later evacuated flow channels in the hollowed tow are typically in the range of about 0.5 mm to about three millimeters. And by way of example, the diameter of the tow material may be in the range of about three to ten millimeters, compatible with the diameter of the flow channel. It is also recognized that a suitable sacrificial filament material may be a low melting organic polymer such as a polylactide, including a low melting polymer filament containing dispersed particles of a decomposition catalyst.

A strand 200 of a selected round outer layer of continuous fiber tow material 202 and inner core of sacrificial filament core material 204 are continuously drawn through a vessel 206 containing a solution 208 of impregnating (or infiltrating) resin. For example, an epoxy resin may be selected for this purpose. The temperature of the solution 208 may be at an ambient temperature (e.g., 20-25° C.). The resin-wetted tow material/sacrificial filament 200 is turned around roller 210, redirected over roller 212 into nip rolls 214 to remove excess resin solution and to direct the excess back into solution 208. The resin-impregnated tow/filament 216 is directed into oven 218 (e.g., at about 60° C.) in which the solvent is evaporated and recovered. At this stage, the resin in the resin-impregnated tow/sacrificial filament material 220 is typically partially cured to a tacky state. The tow material with its sacrificial filament and its tacky, partially-cured resin is ready for rerolling (roller 222), suitably with a paper or polymer interleaf 224 to separate touching portions of the resin-impregnated continuous tow material. The roll of tow material with its sacrificial core material may be stored until it is used in preparation of a lattice structure of tow material like structure 18 in FIG. 1A and structure 418 in FIG. 4, or braided as reinforcing lattice structure 18' in FIG. 1B. In general, and depending on the properties of the specific resin, the resin-impregnated tow material should be stored at a temperature less than 10° C., often about −20° C., until the tow material is to be used. Then the material be warmed to room temperature to being processing into a lattice structure.

When the tow material contains a sacrificial filament, the filament material may be removed by melting or vaporization such as following the time when the members of the intended structure are being heated to cure the enclosing matrix resin of the molded product. The removal of the sacrificial filament material is most easily accomplished from relatively short lengths of relatively straight now rigid sections of the tow material for the reinforcing lattice structure. The sacrificial filament material may be drained, blown, washed, or otherwise removed to clear the channel in the tow material.

FIG. 2B is a schematic illustration of a cross section of a resin-infiltrated tow 220 with its resin impregnated tow fibers 222 and its sacrificial filament core material 204 as produced by the process illustrated in FIG. 2A. When the sacrificial channel template material 204 is later removed, an open channel is provided along the length of the resin-containing tow section 204 for the passage of a heating or cooling fluid through at least portions of a prepared reinforcing lattice structure of the tow material.

In most embodiments of this invention, the polymeric resin, wetting the carbon fiber tow material (or other suitable fibrous tow material), is a thermosetting resin (e.g., an epoxy resin) in its partially cured state. As a section of the resin-infiltrated tow (such as 220 in FIG. 2B) is taken (from its roll or the like) to form a lattice support structure, the resin may be more fully cured over a series of forming steps to enable the winding, braiding, or other shaping of the tow material into a predetermined lattice support structure. Normally when the lattice support structure incorporating a section of tow is suitably shaped, final curing of the resin will be accomplished to rigidify the lattice structure for handling and molding. This may be accomplished, for example, by heating the resin-impregnated tow structure to, for example, about 120° C. over a period of a few minutes to a couple of hours to cure a representative thermosetting resin. A final cure temperature for the resin-impregnated lattice structure may be higher, for example about 175 to about 200° C.

The stiffened structure may then be placed in a suitable mold for the addition of the polymer material that will form the matrix of the composite molded article. In this procedure, those members of the lattice support structure initially containing the sacrificial fiber will still contain the fiber. But when the lattice structure is intended to contain flow channels, a portion of the lattice structure will lie in a portion or portions of the composite molding in which a heat-transfer fluid is intended to be introduced into the molded article and removed from it. So, when the composite molded polymeric article is formed, if necessary, portions of the molded article may be machined away to expose and to provide an inlet and outlet to the lattice structure. Such access also provides openings for the removal of the sacrificial filaments contained in the tow members of the lattice structure. As stated, the molded article may be suitably heated to melt and/or decompose the filamentary sacrificial material permitting it to be drained, blown, or otherwise removed from the cores of the tow material, leaving the desired flow passages. The diameters of the channels in the tow material will often be in the range of a millimeter or so, and flow members placed as inlet and outlet members at the channel openings in the molded device will have somewhat larger cross-sections.

In addition to forming lattice structures of generally straight or mildly curved tow members like those illustrated in FIG. 1A and FIG. 4, the lattice reinforcing structures for the molded polymer articles may be formed by winding continuous lengths of tow material. This practice is illustrated in the following FIGS. 3A-3C.

Figure 3A:
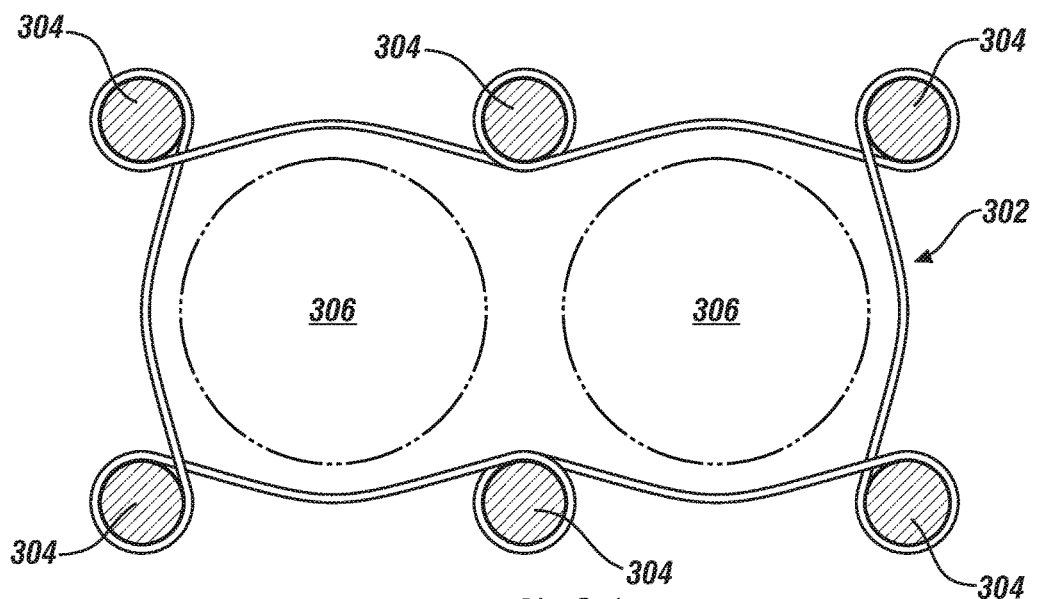
FIG. 3A is a schematic plan view illustration, looking down on the winding of resin-infused, continuous carbon fiber tow around six upright (vertical) posts serving as winding patterns and positioned to form a reinforcing scaffold structure positioned around two cylinder liners in an engine block for an internal combustion engine.

In FIG. 3A, a practice is illustrated for forming a wound reinforcing lattice structure for use in a cylinder housing for a two-cylinder engine. FIG. 3A presents a schematic, plan-view illustration, looking down on the winding of resin-infused, continuous, carbon fiber tow 302 around six upright (vertical) posts 304 serving as winding patterns and positioned to form a reinforcing scaffold structure positioned around two cylinder liners in an engine block for an internal combustion engine. More than one resin-impregnated, continuous carbon fiber tow 302 may be used in the winding process. The respective tows 302 will be bonded together by the curing or hardening of the impregnated resin at the conclusion of the winding process or at selected stages of the winding process. FIG. 3A illustrates the top ends of the winding posts 304 and the location of suitably sized pattern cores 306 for the location of the reinforcing structure around the two engine cylinders.

Figure 3B:
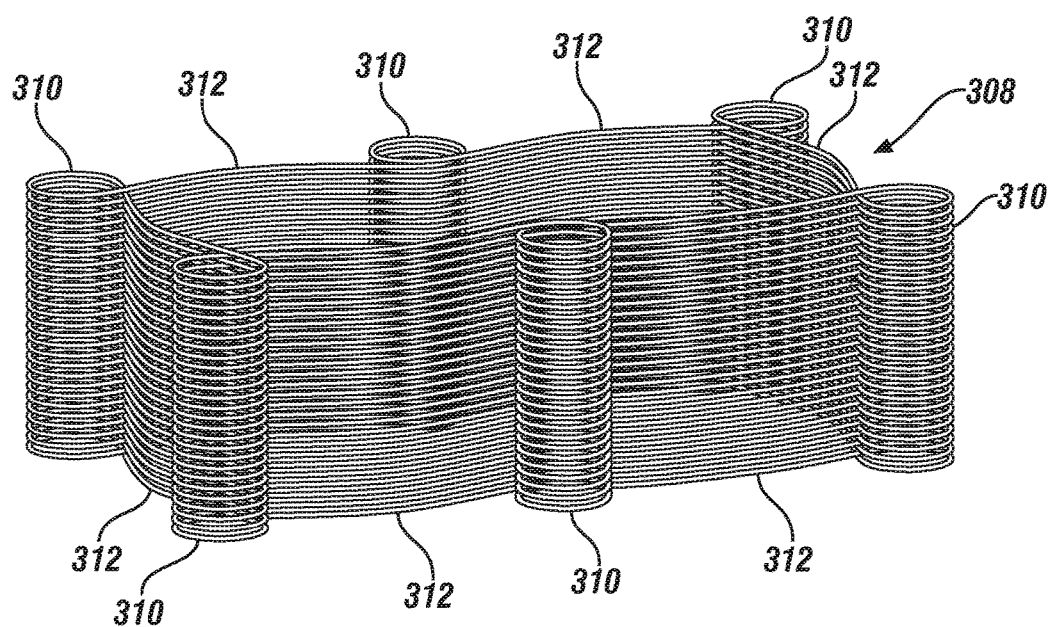
FIG. 3B illustrates the lattice reinforcing structure of the wound core material after the impregnating resin has been cured and the stiffened lattice structure has been lifted from the winding posts and the pattern cores for the cylinders of the engine.

FIG. 3B is an oblique view of the wound lattice structure 308 after the wound and resin-cured tow structure has been removed from the posts 304 and from the cylinder pattern cores 306. Optionally, hollow posts could be left in place and used, for example, for the insertion of bolts to join an engine head member and/or a crank case member to the final composite reinforced plastic cylinder housing. Wound tow lattice structure 308 consists of six parallel hollow post-like structures 310 of equal length and diameter. As illustrated, the hollow posts 310 of the wound tow material are aligned in the pattern of a rectangle with four wound posts 310 at the corners of the rectangle and two posts 310 at the mid-points of the long sides of the rectangle. The rectangular configuration of the alignment of the hollow posts 310 locates them for reinforcement of a to-be-molded reinforced polymer cylinder housing body around two cylinder liners of an engine. As further illustrated in FIG. 3B, the six hollow posts 310 are interconnected and secured in fixed positions in the predetermined pattern by many parallel wound strands 312 of the same resin-bonded tow material. The connecting strands 312 are formed of the resin-impregnated continuous tow material as steps in the winding process by which the unitary lattice structure 308 is formed. Upon the setting of the impregnating resin, both the wound posts 310 and the interconnecting strands 312 are stiffened such that the unitary reinforcing lattice structure 308 can be moved and placed in a mold cavity defining the engine cylinder housing and, for example, a short (non-continuous) fiber-reinforced liquid epoxy resin injected into the mold around the reinforcing lattice structure 308 to form a lattice structure reinforced composite cylinder housing molding 314 as illustrated in FIG. 3C.

Figure 3C:
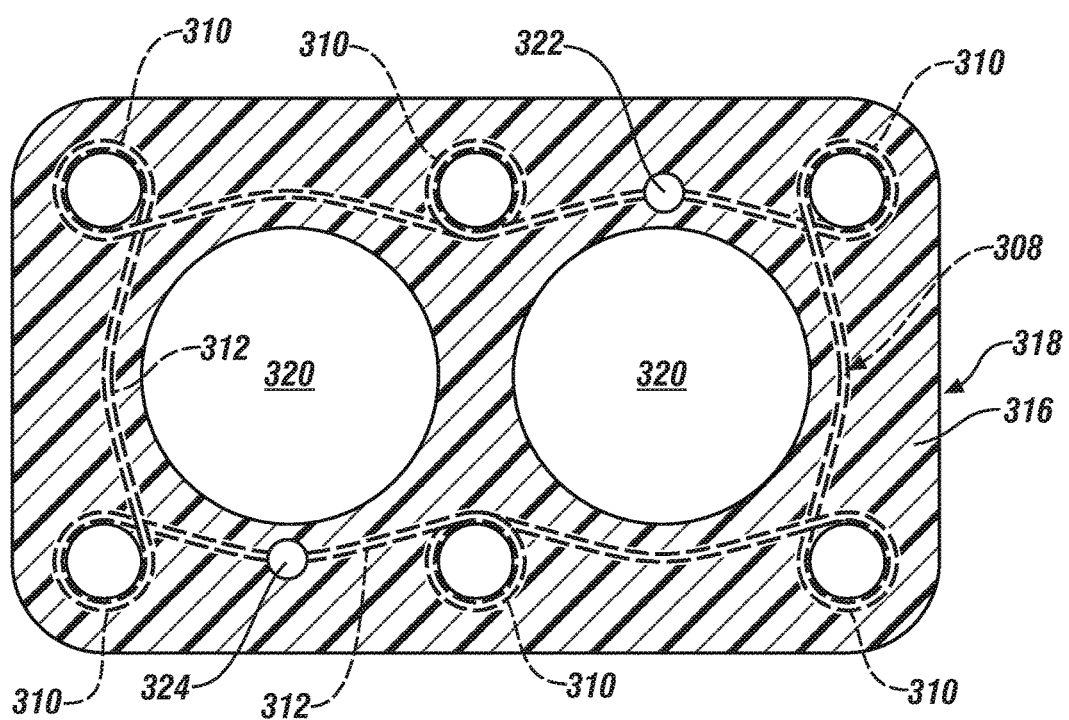
FIG. 3C is a schematic, squared-off, top view of a molded cylinder housing formed of a short fiber reinforced epoxy resin molded around and embedding the reinforcing lattice structure, formed of the wound tow material, as illustrated in FIGS. 3A and 3B. Further in FIG. 3C, an inlet channel and an outlet channel have been drilled in the composite polymer molding to intersect sections of the horizontal continuous carbon fiber tows to enable a cooling fluid to be passed through hollow cores formed in the tows.

FIG. 3C presents a top view of the composite engine cylinder housing molding 318 comprising a molded matrix 316 of, for example, a thermoset epoxy resin containing relatively short (e.g., less than six millimeters in length), discontinuous reinforcing carbon fibers. The fiber-reinforced epoxy resin matrix 316 is molded around the unitary reinforcing lattice structure 308. It is seen that the reinforced lattice structure 308 occupies only a small portion of the total volume of the composite molding of the cylinder liner 318.

In the assembly of an engine, metal cylinder liners (not shown) and their circumscribing coolant passages (not shown) would be inserted into the central openings 320 in the composite molding 318. And metal liners for bolts (neither shown) could be inserted in the hollow openings of the six post members 310 of the composite molding 318.

When the tow material, containing a core of sacrificial filaments, is used in forming the wound lattice support structure 308, it is necessary to remove the sacrificial filament material from which the tow material. In FIG. 3C, two vertical holes 322, 324 have been carefully drilled through the composite cylinder liner molding 318. The holes 322, 324 penetrate a portion of the short fiber reinforced epoxy matrix material and they sever small sections of each of the horizontal tow members 312 on each side of the polymeric molding 318. These strategically-located holes permit sacrificial filament material to be melted or decomposed and drained, blown, or otherwise removed from the entire reinforced lattice structure 308. When the sacrificial material has been removed, the channels in each of the many horizontal tow strips 312 permit a heat transfer fluid to be introduced into the cylinder liner body 318. For example, cooling air could be introduced into one or both openings of hole 324 and removed form one or both opening of hole 322. Suitable connectors or closures may be attached to each of the hole openings to accommodate the programmed delivery of a suitable heat transfer fluid to the molded composite polymeric cylinder liner body 318.

In still another embodiment of the invention, a process is disclosed for modifying a continuous three-dimensional fiber fabric (similar to the Parabeam commercial material) for reinforcement of molded polymer articles. An example of the use of such a three-dimensional reinforcing material is in the reinforcement of a vehicle engine housing defining hollow cylindrical portions requiring such reinforcement. The Parabeam-type three-dimensional fiber fabric is characterized by a relatively dense layer of fine fibers, defining the surfaces of a sandwich type fabric, with a lower density (sparse) group of fibers interconnecting the two surface layers. While the fibrous surface layers are quite dense, there is void space between the fibers interconnecting the surface layers. The commercial three-dimensional fabric material is designed to replace sandwich panels that have a composite skin with a foam or honeycomb core. But in this invention the group of fibers forming the interior of the material are wetted with a thermosetting resin to stiffen them. But the spaces between the sparse interior fibers are retained. These spaces will later be filled with a liquid matrix resin so as to utilize the Parabeam-type fabric as a reinforcing structure.

For example, the sparse group of fibers in the interior of a suitable section (or sections) of such three-dimensional fiber fabric may be wetted in the interior region with a suitable thermosettable polymeric resin. This resin permits stiffening of the three-dimensional, sandwich-type fabric. The section of resin-impregnated fabric is prepared to have a suitable two-dimensional shape and thickness, for example for wrapping around a cylindrical pattern, such as the cylinder bore (and its surrounding coolant passage) for a reciprocating piston internal combustion engine. The wetting resin is hardened to set the shape of the porous fiber into a hollow reinforcing sleeves to serve as reinforcing structures around the cylinder-defining areas of a composite polymer molded cylinder housing. One or more such sleeves, shaped as hollow fibrous cylinders or semi-cylinders may then be strategically placed in a suitable mold and a short fiber reinforced polymer injected into the mold and around and into the porous fiber sleeves to form, for example, a cylinder housing member.

Thus, examples have been provided illustrating the preparation of reinforcing lattice structures formed of continuous tow material. The examples are intended to be illustrations of practices of the invention and limitations of the scope of the invention.

The invention claimed is:

1. A molded reinforced polymeric article comprising a thermoplastic or thermoset polymer matrix in which a portion of the polymer matrix is reinforced by a lattice structure of continuous tow material, the lattice structure being embedded in the polymer matrix, the lattice structure occupying less than twenty percent of the total volume of the molded reinforced article; the lattice structure comprising a group of post-like structures formed of the continuous tow material and each of the post-like structures being interconnected by a least one length of the continuous tow material to define an enclosed reinforcing lattice structure within the polymer matrix.

2. A molded reinforced polymeric article as stated in claim 1 in which the lattice structure is formed of at least one of (i) joined members of individual strips of continuous tow material, (ii) wound sections of continuous tow material, and (iii) braided strips of continuous tow material.

3. A molded reinforced polymeric article as stated in claim 1 in which at least a portion of the lattice structure of continuous tow material contains a vascular passage which is exposed at an external surface or surfaces of the polymer matrix of the molded reinforced article to permit the flow of a fluid into the vascular passage, through the vascular passage, and out of the vascular passage.

4. A molded reinforced polymeric article as stated in claim 1 in which the continuous tow material is formed of at least one thousand continuous fibers.

5. A molded reinforced polymeric article as stated in claim 1 in which the lattice structure is formed of braided strips of continuous fibers, at least some of the continuous fibers in the braided structure having an internal vascular passage for permitting the flow of a fluid through the length of the vascular passage.

6. A molded reinforced polymeric article as stated in claim 1 in which the continuous tow material in the reinforcing structure is impregnated with a thermosettable resin and stiffened by the resin in its thermoset state.

7. A molded reinforced polymeric article as stated in claim 1 in which the lattice structure of tow material is joined members of individual strips of continuous tow members.

8. A molded reinforced polymeric article as stated in claim 1 in which the lattice structure of tow material is formed of wound sections of continuous tow material.

9. A molded reinforced polymeric article as stated in claim 1 in which the polymeric article is to be a cylindrical housing structure for a cylinder liner of an internal combustion engine and in which the lattice structure of tow material is characterized by a group of parallel hollow posts formed of wound continuous tow material and arranged in a cylindrical or rectangular pattern to reinforce regions of the molded cylinder housing structure shaped to contain the cylinder liner of the engine, the posts being interconnected by at least one length of the tow material.

10. A molded reinforced polymeric article as stated in claim 1 in which the matrix polymer is uniformly reinforced by non-continuous reinforcing fibers, the non-continuous reinforcing fibers having a length up to six mm.

11. A molded reinforced polymeric article as stated in claim 1 in which continuous fibers for the tow material or short non-continuous fibers for reinforcement of matrix resins are one of carbon fibers, basalt fibers, glass fibers, aramid polymer fibers, ultrahigh molecular weight polyethylene fibers, and natural fibers.

12. A molded reinforced polymeric article as stated in claim 1 in which the resin impregnating the tow fibers is a thermoset polymer selected from the group consisting of epoxy resins, phenolic resins, polyurethanes, polyesters, polyimides, and benzoxazines.

* * * * *